(12) United States Patent
Suzuki et al.

(10) Patent No.: US 7,635,538 B2
(45) Date of Patent: Dec. 22, 2009

(54) BATTERY

(75) Inventors: Hiroyasu Suzuki, Nagoya (JP); Takuya Miyashita, Okazaki (JP)

(73) Assignee: Mitsubishi Jidosha Kogyo Kabuhsiki Kaisha, Tokyo (JP)

( * ) Notice: Subject to any disclaimer, the term of this patent is extended or adjusted under 35 U.S.C. 154(b) by 625 days.

(21) Appl. No.: 11/429,242

(22) Filed: May 8, 2006

(65) Prior Publication Data

US 2006/0257730 A1    Nov. 16, 2006

(30) Foreign Application Priority Data

May 10, 2005    (JP)    ............................. 2005-137519

(51) Int. Cl.
*H01M 2/08*    (2006.01)
(52) U.S. Cl. ....................................... 429/174; 429/185
(58) Field of Classification Search ................. 429/174, 429/175, 185
See application file for complete search history.

(56) References Cited

U.S. PATENT DOCUMENTS

| 5,905,001 | A  | * | 5/1999  | Elliott et al. ............ 429/174 X |
| 2002/0004168 | A1 | * | 1/2002  | Iwata et al. ............. 429/175 X |
| 2002/0192544 | A1 | * | 12/2002 | Kodama ..................... 429/175 |
| 2005/0136324 | A1 | * | 6/2005  | Yamada et al. .............. 429/175 |
| 2005/0287430 | A1 | * | 12/2005 | Kim et al. ............... 429/175 X |

FOREIGN PATENT DOCUMENTS

JP    2003-7256 A    1/2003

* cited by examiner

*Primary Examiner*—Stephen J. Kalafut
(74) *Attorney, Agent, or Firm*—Birch, Stewart, Kolasch & Birch, LLP

(57) ABSTRACT

A battery includes a battery casing, a lid member, and a pair of terminals. The battery casing has an opening and a battery element stowed in the inside, and is formed of a film material. The lid member is stowed in the opening and is adhered to an opening edge of the battery casing, thereby hermetically sealing the opening. The pair of terminals are provided to the lid member.

8 Claims, 5 Drawing Sheets

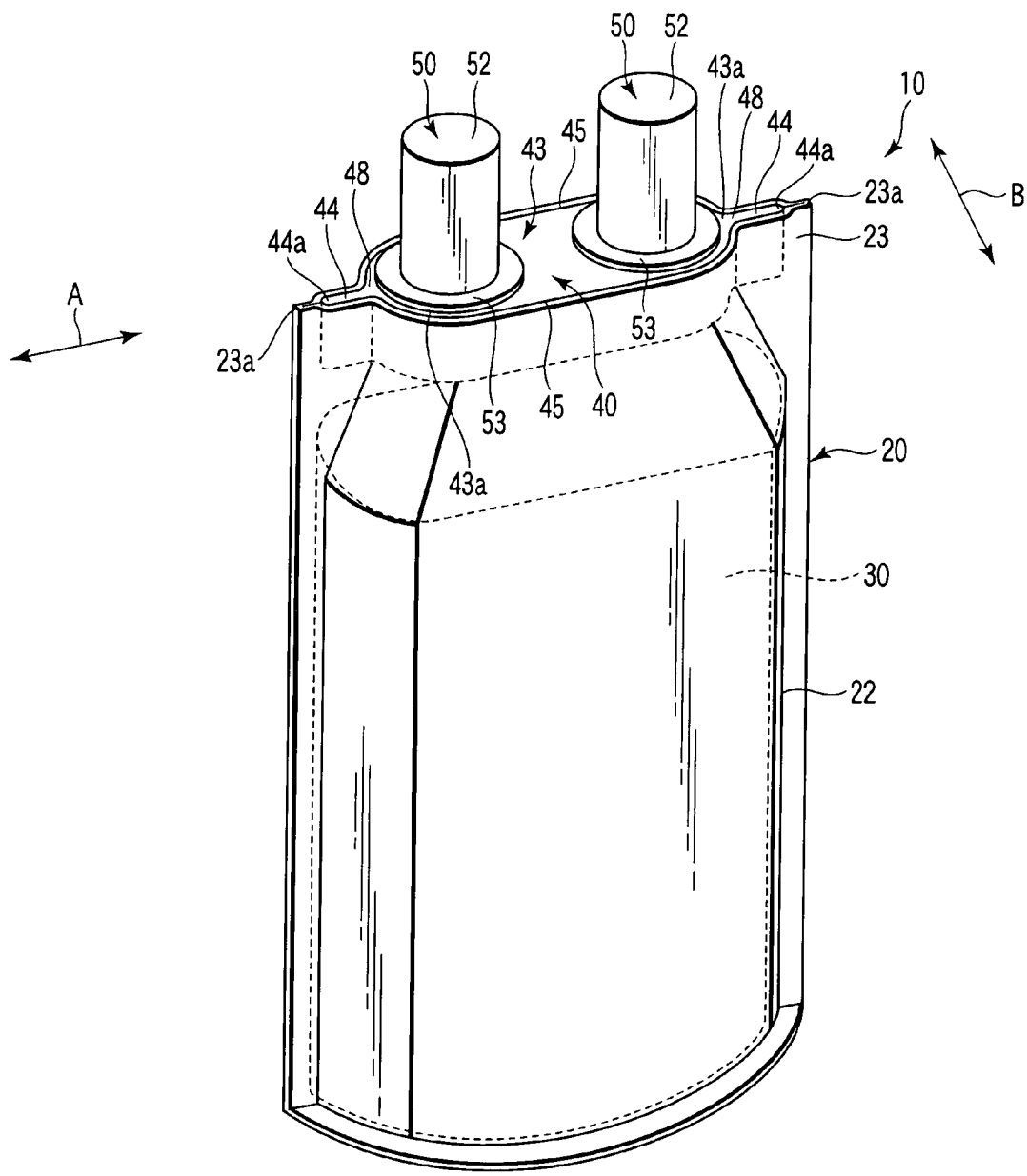
F I G. 1

BATTERY

CROSS-REFERENCE TO RELATED APPLICATIONS

This non-provisional application incorporates by reference the subject matter of Application No. 2005-137519, filed in Japan on May 10, 2005, on which a priority claim is based under 35 U.S.C. §119 (a).

BACKGROUND OF THE INVENTION

1. Field of the Invention

The present invention relates to a laminated battery.

2. Description of the Related Art

An ordinary battery has a battery casing capable of stowing a battery element, and a sealing plate closing the battery casing. A battery of this type is formed such that a battery casing is formed of resin, and metal is laminated to an inner side of the battery casing. A battery of this type is disclosed in Jpn. Pat. Appln. KOKAI Publication No. 2003-7256, for example.

For a battery casing formed of resin, it is considered that the battery casing needs to be formed with an increased thickness to impart strength to the battery casing. As such, the battery tends to be large in size corresponding to the increased thickness.

Under these circumstances, batteries having a battery casing formed of a laminate film have been proposed. A battery of this type is formed into a bag shape having an opening. Respective terminals of positive and negative electrodes connected to a battery element are exposed from the opening of the battery casing. An edge portion of the opening is adhered while inwardly clamping the positive and negative terminals. In this manner, the opening of the battery casing is hermetically sealed.

However, since the respective terminals are supported by the edge portion of the opening of the laminate film battery casing, the support stiffness for the respective terminals is low. If a secondary battery including a plurality of cells is constructed using, as the cells, batteries respectively having laminate film battery casings, terminals of the respective cells need to be electrically connected to each other. When the respective terminals are electrically connected to each other, it is disadvantageous if the support stiffness for the terminals is low. Further, the laminate film battery casing has to be hermetically sealed after the terminals are supported, and thus the shape of the terminal is inevitably limited to a thin foil shape. As regards freedom of design with respect to the above electrical connection of cell terminals, and regulating the electrical capacity, this construction is not preferable.

BRIEF SUMMARY OF THE INVENTION

A battery according to the present invention includes a battery casing, a lid member, and a pair of terminals. The battery casing has an opening and a battery element stowed in the inside, and is formed of a film material. The lid member is stowed in the opening and is adhered to an opening edge of the battery casing, thereby hermetically sealing the opening. The pair of terminals are provided to the lid member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The nature of this invention, as well as other objects and advantages thereof, will be explained in the following with reference to the accompanying drawings, in which like reference characters designate the same or similar parts through the figures and wherein:

FIG. 1 is a perspective view of a battery according to one embodiment of the present invention;

DETAILED DESCRIPTION OF THE INVENTION

Figure 2:
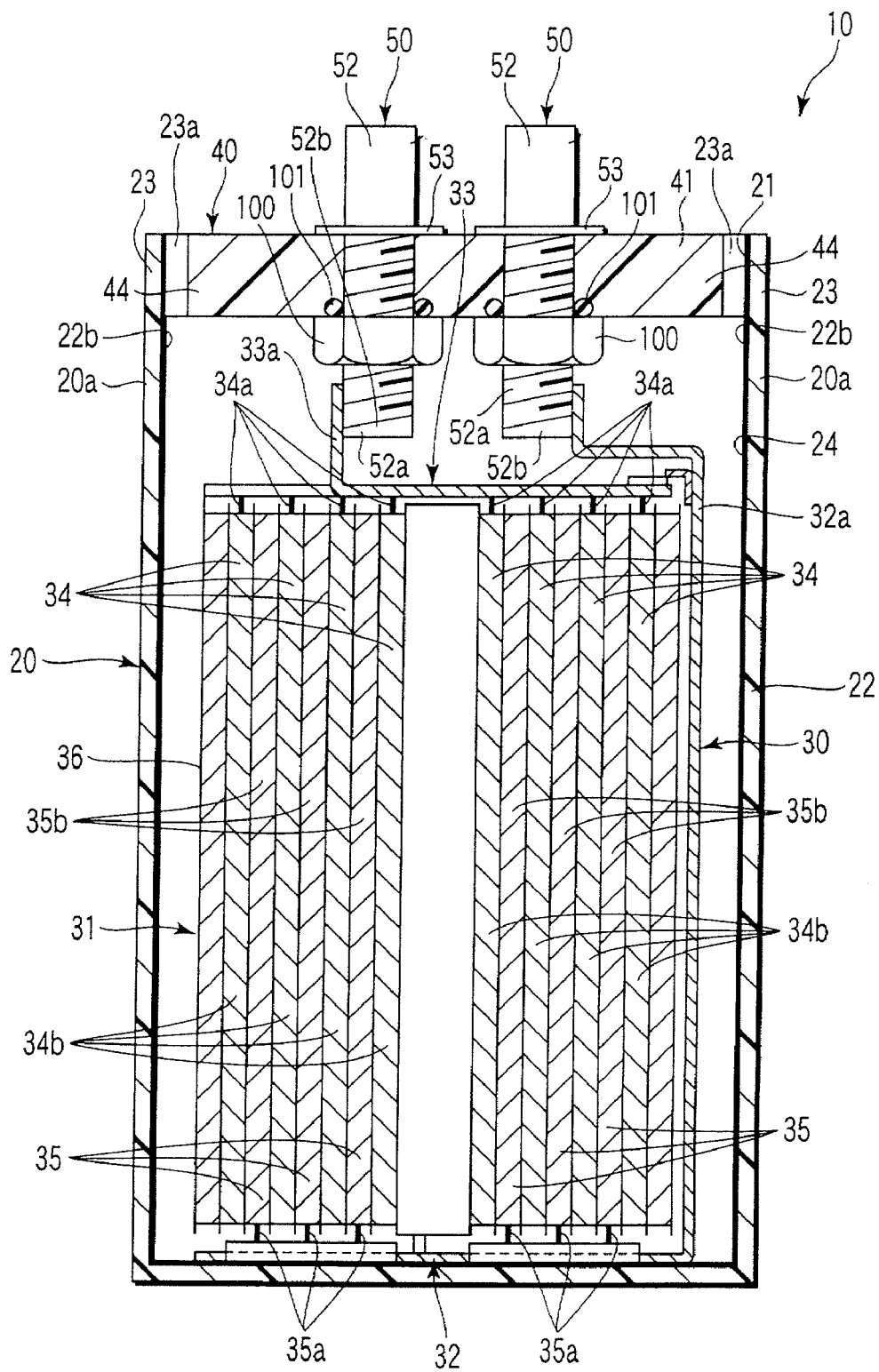
FIG. 2 is a cross sectional view of the battery shown in FIG. 1.

A battery according to an embodiment of the present invention will be described herebelow with reference to FIGS. 1 to 5. FIG. 1 is a perspective view of a battery 10, and FIG. 2 is a cross sectional view of the battery 10. In the present embodiment, for example, a lithium ion battery is used for the battery 10. However, the battery 10 is not limited to the lithium ion battery.

As shown in FIG. 2, the battery 10 includes a battery casing 20, a battery element 30, a lid member 40, and a pair of terminals 50.

Figure 3:
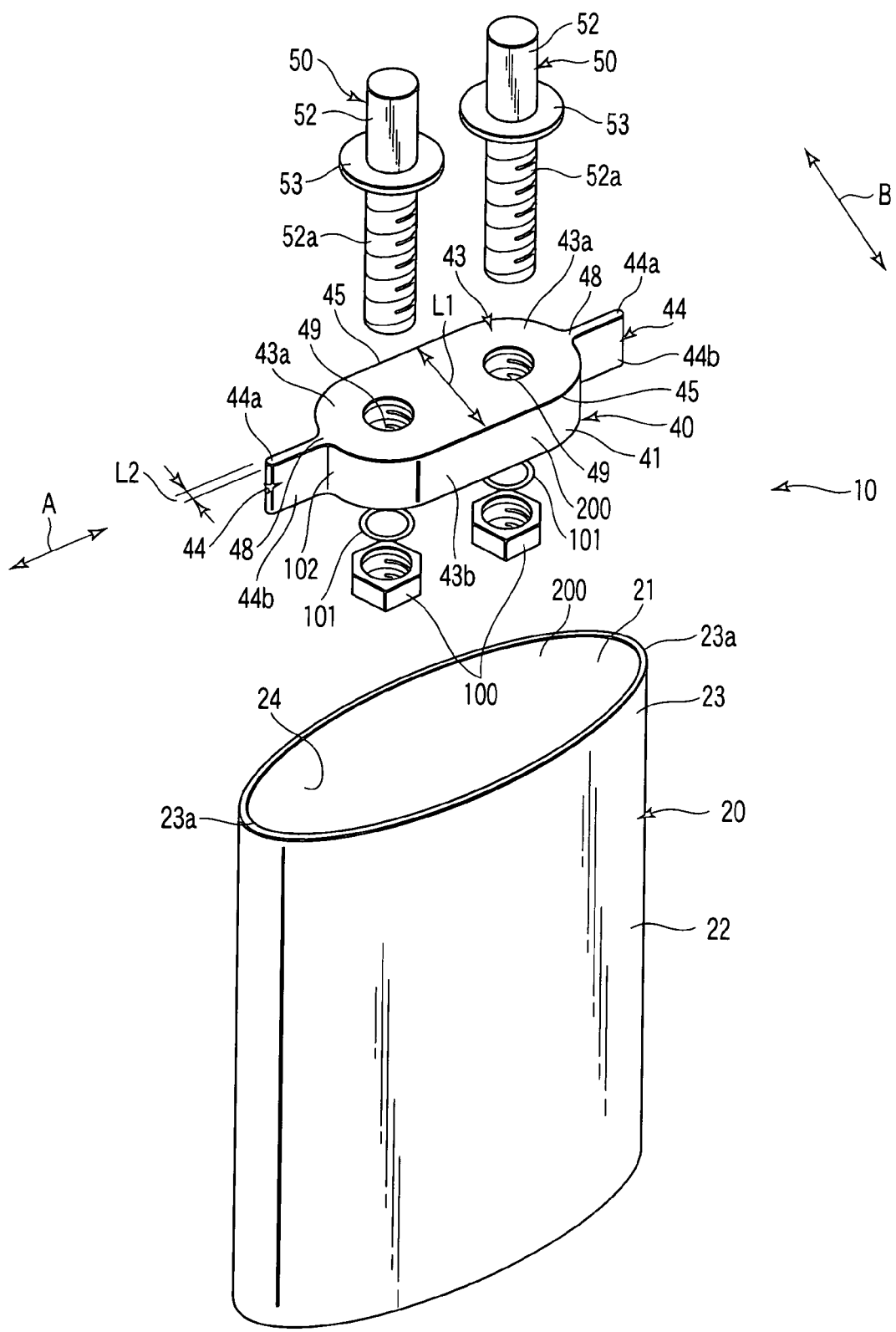
FIG. 3 is an exploded perspective view of the battery shown in FIG. 1, in which a battery element is not shown.

FIG. 3 is an exploded perspective view of the battery 10, in which the battery element 30 is not shown. As shown in FIG. 3, the battery casing 20 is in a bag shape having an opening 21 on one end. The opening 21 has, for example, a shape longer in one direction.

As shown in FIG. 2, the battery casing 20 is formed of a laminate film 22. The laminate film 22 is formed by laminating aluminum 22b onto polyethylene 20a. As such, the battery casing 20 is thin. According to the present invention, the laminate film 22 is an example of a film material. Although the laminate film 22 is shown with an exaggerated thickness in the drawing, the actual thickness of the laminate film 22 is small.

The battery element 30 includes an electrode body 31, a positive electrode conductor 32, and a negative electrode conductor 33. The electrode body 31 includes a negative electrode plate 34, a positive electrode plate 35, and a separator 36.

The negative electrode plate 34 is formed by bonding a negative electrode active material 34b to a current collector sheet 34a. The positive electrode plate 35 is formed by bonding a positive electrode active material 35b to a current collector sheet 35a. The electrode body 31 is formed in such a manner that a material formed of the negative electrode plate 34 and the positive electrode plate 35 with the separator 36 interposed therebetween is wound in a hollow state (with an air core in the center).

In the present embodiment, the current collector sheet 34a upwardly protrudes from the negative electrode active material 34b. The current collector sheet 35a downwardly protrudes from the positive electrode active material 35b. In FIG. 2, only portions of the current collector sheets 34a and 35a protruding from the respective negative and positive electrode active materials 34b and 35b are shown.

The negative electrode conductor 33 is fitted to an upper portion of the electrode body 31. The current collector sheet 34a is electrically connected to the negative electrode conductor 33. The positive electrode conductor 32 is fitted to a lower portion of the electrode body 31. The current collector sheet 35a is electrically connects to the positive electrode conductor 32. The shapes of the negative electrode conductor 33 and the positive electrode conductor 32 will be described later in detail.

As shown in FIGS. 1 to 3, the lid member 40 is stowed into the opening 21 of the battery casing 20. The lid member 40 hermetically seals the opening 21 in such a manner that a peripheral surface 41 of the lid member 40 is adhered to an opening edge 23 of the opening 21 of the battery casing 20. The lid member 40 is made of resin, for example, and has a high stiffness.

As shown in FIG. 3, the lid member 40 has a base portion 43 and tab portions 44. The base portion 43 corresponds to examples of neighborhoods of portions where the terminals are provided. According to the present invention, the tab portions 44 are examples of portions other than the neighborhoods of portions where the pair of terminals are provided.

The tab portions 44, respectively, are provided in two end portions of the base portion 43, and each extend along a first direction A from the base portion 43. That is, the tab portions 44 each extend along one direction from the base portion 43. The tab portions 44 will be described later in detail.

Mounting holes 49 threadingly engaging with the respective ones of a pair of terminals 50 described later are formed in the base portion 43. The mounting holes 49 are thus formed in a pair, and are aligned along the first direction A. The respective mounting holes 49 pass through the base portion 43. Internal threads are formed on an inner face of the respective mounting holes 49. The cross sectional shape of the base portion 43 is, for example, substantially constant in the height direction.

In the base portion 43, the range from the one mounting hole 49 to the other mounting hole 49 extends substantially linearly along the first direction A. An edge 45 of the base portion 43 is, therefore, substantially parallel along the first direction A in the range from the one mounting hole 49 to the other mounting hole 49.

In the base portion 43, a planar shape of the both end portions 43a is semicircular when viewed from above. The two end portions 43a along the first direction A are neighborhoods of the mounting holes 49, respectively. As such, in the two end portions 43a, the edge 45 is formed smoother than the diameters of the respective mounting holes 49.

In the range from the one mounting hole 49 to the other mounting hole 49, a width L1 of the base portion 43 along a second direction B perpendicular to the first direction A is determined taking into account the support stiffness of the respective terminals 50 in the base portion 43. Thus, the stiffness of the respective terminals 50 are sufficiently guaranteed.

The tab portions 44 are formed in the two end portions 43a of the base portion 43. More specifically, the respective tab portions 44 are provided to ends 48 of the base portion 43. The ends 48, respectively, are portions located most externally in the first direction A. The tab portions 44, respectively, extend substantially linearly along the first direction A. Lead end portions 44a of the tab portions 44 are each formed into a semicircular shape.

The respective tab portions 44 are formed with a width L2 along the second direction B narrower than the width L1. The cross sectional shape of the respective tab portions 44 is substantially constant in the height direction.

The width L2 of the tab portions 44 in the second direction B is shown to be thick in the drawing, but actually is thin.

A boundary portion 102 between a peripheral surface 43b of the base portion 43 and a peripheral surface 44b of the tab portion 44 is formed to be smoothly continuous from the base portion 43 to the tab portion 44. Further, the plane shape of each of the two end portions 43a of the base portion 43 is formed substantially circularly arcuate, such that the base portion 43 and the respective tab portions 44 are even more smoothly continuous to one another.

Each terminal 50 is metallic and has a main body 52 and a collar portion 53. The main body 52 is shaped like a pillar. The main body 52 is circularly columnar, for example. The collar portion 53 is provided to the main body 52. The collar portion 53 expands outwardly from the peripheral surface of the main body 52. A one-side portion of the main body 52 is formed with a screw thread portion 52a threadingly engaging the mounting holes 49. An external screw is formed on the peripheral surface of the screw thread portion 52a.

As shown in FIG. 2, the terminal 50 on one side is screwed into the mounting hole 49 until the collar portion 53 contacts with the lid member 40. Similarly, the terminal 50 on the other side is screwed into the mounting hole 49 on the other side.

The screw thread portions 52a of the respective terminals 50 have a length allowing an end 52b to extend past the lid member 40 when screwed into the mounting hole 49. The respective terminals 50 are fixedly secured with a lock nut 100 being tightened and threadingly engaged with the respective terminals 50.

As such, the end 52b of the respective terminals 50 is protruded into the battery casing 20 in the state where the lid member 40 is fixedly secured to the battery casing 20. O-rings 101 are provided between the respective lock nuts 100 and the lid member 40. The O-rings 101 fluid-tightly seal the mounting holes 49.

The shape of the negative electrode conductor 33 and the shape of the positive electrode conductor 32 will be described in detail herebelow. As shown in FIG. 2, the negative electrode conductor 33 is planar, and has a negative lead piece 33a. The negative lead piece 33a is formed in such a manner that a part of the negative electrode conductor 33 is folded. The negative lead piece 33a is electrically coupled to one of the terminals 50 on the other side.

The positive electrode conductor 32 is planar, and has a positive lead piece 32a that extends upwardly along an inner face 24 of the battery casing 20. The positive lead piece 32a is electrically coupled to the other terminal 50.

An example of a manufacturing process for the battery 10 will be described herebelow.

As shown in FIG. 3, the respective terminals 50 are fixedly secured to the lid member 40. More specifically, the respective terminals 50 are threadingly engaged into the mounting holes 49, and thereafter, the O-rings 101 are fitted to the lid member 40.

Then, the respective terminals 50 are fixedly secured with the lock nuts 100. The battery element 30 is stowed into the battery casing 20. In this event, the negative lead piece 33a and one of the terminals 50 are electrically coupled together. Similarly, the positive lead piece 32a and the other terminal 50 are coupled together.

Figure 4:
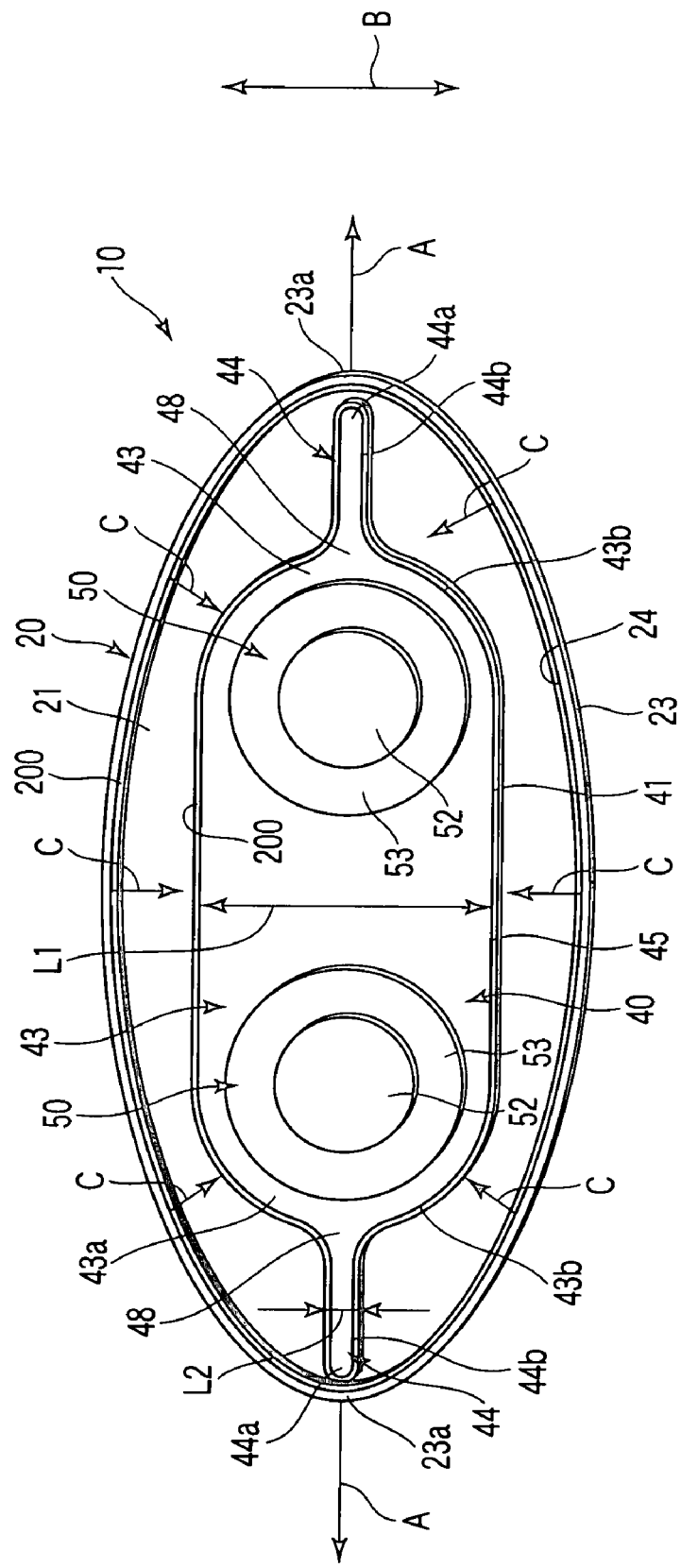
FIG. 4 is a plan view showing a state in which a lid member shown in FIG. 1 is stored in an opening of a battery casing.

Subsequently, the lid member 40, to which the terminals 50 are fixedly secured, is fixedly secured to the battery casing 20. FIG. 4 is a top plan view showing the state where the lid member 40 is stowed in the opening 21. When fixedly securing the lid member 40 to the battery casing 20, first, the lid member 40 is stowed into the opening 21, as shown in FIG. 4.

Then, an opening edge 23 of the battery casing 20 is progressively adhered onto the peripheral surface 41 of the lid member 40 by using an adhesive 200. More specifically, end portions 23a of the opening edge 23 along the first direction A, i.e., portions of the opening edge 23 that oppose the lead end portions 44a of the tab portions 44, are pulled along the first direction A. The adhesive 200 is applied onto the inner face of the opening edge 23 and the peripheral surface 41 of the lid member 40.

Then, as shown by an arrow C, the opening edge 23 is progressively moved to the lid member 40. Then, the opening edge 23 is pressed and adhered onto the peripheral surface 41 of the lid member 40 along the direction from the base portion 43 to the tab portions 44. Thereby, the opening edge 23 and the lid member 40 are brought into a hermetically sealed state.

The adhesive 200 is applied onto the inner face of the opening edge 23 and the peripheral surface 41 of the lid member 40, as described above. However, no limitation is imposed on the manner that the adhesive 200 is applied to both the inner face of the opening edge 23 and the peripheral surface 41 of the lid member 40. For example, the adhesive 200 may be applied only onto either one of the inner face of the opening edge 23 and the peripheral surface 41 of the lid member 40.

In addition, the adhesive 200 may be applied only onto any one of a portion of the peripheral surface 41 of the lid member 40 and a portion of a range opposite to the peripheral surface 41 of the lid member 40 on the inner face of the opening edge 23. Thus, it is sufficient inasmuch as the adhesive 200 is applied onto at least one of the inner face of the opening edge 23 and the peripheral surface 41 of the lid member 40.

Figure 5:
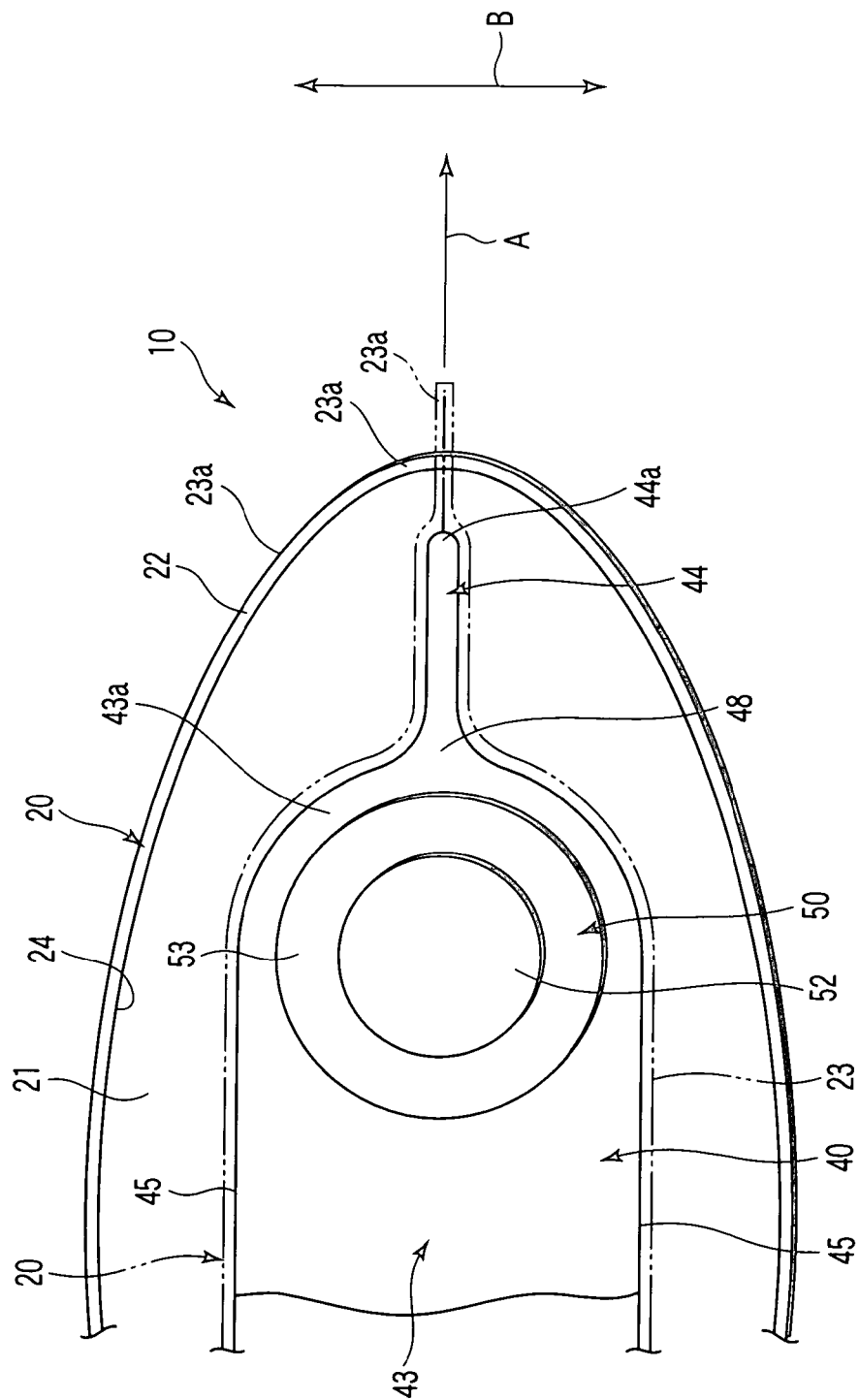
FIG. 5 is a plan view showing states before and after an edge portion of the opening of the battery casing shown in FIG. 4 is adhered to a peripheral surface of the lid member.

FIG. 5 is a top plan view showing states before and after the opening edge 23 is adhered to the peripheral surface of the lid member 40. The states before and after the opening edge 23 is adhered to the lid member 40 are substantially the same as respective neighborhoods of one of the tab portions 44 and the other tab portion 44. As such, FIG. 5 shows a typical example of the neighborhood of one of the tab portions 44. The drawing shows the state where the battery casing 20 shown by a double-dotted line is adhered to the peripheral surface 41 of the lid member 40.

With reference to FIG. 5, as the opening edge 23 is progressively adhered to the peripheral surface 41 along the direction from the base portion 43 to the tab portions 44 after the end portions 23a of the opening edge 23 have been pulled along the first direction A, the end portions 23a remain with left-over portions not adhered to the peripheral surface 41 of the lid member 40. The left-over portions of the end portions 23a are, however, adhered with one another, as shown by a double-dotted line in the drawing.

A peripheral surface 43b of the base portion 43 and the peripheral surface 44b of the tab portion 44 are smoothly continuous with one another. Therefore, the opening edge 23 is efficiently adhered to the peripheral surface 41 of the lid member 40. In addition, the lead end portion 44a of the tab portion 44 is substantially semicircular shape. Therefore, when the end portions 23a are adhered with one another, gaps are prevented from being easily formed between the end portion 23a and the opening edge 23.

In the process of adhesion of the opening edge 23 onto the peripheral surface 41 of the lid member 40, gases in the battery casing 20 are drawn out. Consequently, as shown in FIG. 1, the battery casing 20 is substantially adhesively attached to the battery element 30 in the state in which opening edge 23 is adhered to the lid member 40. As such, the battery element 30 is supported by the battery casing 20, thereby improving the positional stability of the battery element 30.

In the battery 10 thus constructed, the respective terminals 50 are fixedly secured to the lid member 40. The lid member 40 is formed of, for example, resin, so that the stiffness thereof is high. Accordingly, the support stiffness for the respective terminals 50 is high.

Further, the battery casing 20 is formed of the laminate film 22 that is thin, therefore restraining the battery 10 to be enlarged in size.

Further, since the terminals 50 are provided to extend past the lid member 40, the support stiffness for the respective terminals 50 can be increased, and the cross-sectional areas of the respective terminals 50 can be relatively easily changed. Accordingly, the support stiffness for the respective terminals 50 and the degree of design freedom from the respective terminals 50 are secured, and the degree of design freedom for the respective terminals 50 can be improved in consideration of the electrical capacity.

Accordingly, the battery 10 is restrained from being enlarged in size, the support stiffness for the respective terminals 50 is improved, and the degree of design freedom is improved.

With the battery casing 20 substantially adhesively attached to the battery element 30, the positional stability of the battery element 30 is improved. Thereby, damage of the battery 10 is restrained.

Further, the respective terminals 50 are fixedly secured to the battery casing 20 via the lid member 40, so that the terminals 50 do not directly contact with the battery casing 20. As described above, the lid member 40 has a smooth shape that does not permit easy formation of gaps between itself and the battery casing 20.

As such, no gap is formed in the battery casing 20 because of the shape of the respective terminals 50. That is, the cross sectional shape of the respective terminals 50 cannot be the cause of gap occurrence, so that the cross sectional shape can be enlarged. Consequently, the battery 10 allows a large current to flow.

Further, with the respective terminals 50 formed into the columnar shape, the cross-sectional areas of the respective terminals 50 can be increased. Accordingly, the respective terminals 50 allow the flowing of the large current, consequently increasing the output capacity of the battery 10.

Further, the width L1 of the plane of the base portion 43 along the second direction B is largely formed, whereby the support stiffness of the respective terminals 50 is improved.

Further, the peripheral surface 43b of the base portion 43 and the peripheral surface 44b of the respective tab portion 44 are smoothly continuous to one another. Accordingly, the end portion 23a of the battery casing 20 can easily be adhered onto the peripheral surface 41 of the lid member 40.

Further, since the lid member 40 has the tab portions 44, the opening edge 23 can be efficiently adhered to the lid member 40, as described further in detail below.

When the opening edge 23 is pulled along the first direction A to be adhered to the peripheral surface 41 of the lid member 40, the shape of the opening 21 is extended in the first direction A and is narrowed in the second direction B.

The width L1 of the plane of the base portion 43 along the second direction B is increased to secure the support stiffness for the respective terminals 50. As such, when the respective end portions 23a of the opening edge 23 are pulled along the first direction A, the opening edges 23 first contact the base portion 43. And then the opening edge 23 contacts the tab portion 44. Then, the opening edge 23 is progressively adhered to the peripheral surface 41 along the direction from the base portion 43 to the tab portions 44.

In this event, since the lid member 40 has the tab portions 44, when the opening edge 23 is closed, the shapes of two side portions of the opening edge 23 are substantially symmetrical with the base portion 43 being sandwiched therebetween.

In other words, in the case where the lid member 40 does not have the tab portions 44, it is contemplated that the shapes of two-side portions of the closed opening edge 23 are not symmetrical with the base portion 43 being sandwiched therebetween. More specifically, in the event that two-side portions of the opening edge 23 remained with the left-over portions not adhered to the lid member 40 are adhered to one another, it is contemplated that portions opposing the portions where two-side portions of the opening edge 23 are adhered together in the lid member 40 are not formed symmetric with the base portion 43 being sandwiched. As a result, the battery casing 20 is formed in a warped state. In this case, the opening edge 23 cannot easily be adhered to the lid member 40.

As described above, since the lid member 40 has the tab portions 44, the opening edge 23 is efficiently adhered to the lid member 40.

Further, the width L2 of the respective tab portions 44 is narrower than the width L1 of the base portion 43. Accordingly, with the tab portions 44 provided to the lid member 40, the lid member 40 is shaped such that the widths of two end portions thereof along the first direction A are narrow.

As such, the end portions 23a of the opening edge 23 of the battery casing 20 do not have to be extended along the direction B so much to stow the lid member 40 into the battery casing 20. This makes it easy to stow the lid member 40 into the opening 21, thereby facilitating the process of adhering the opening edge 23 to the peripheral surface 41 of the lid member 40.

The cross sectional shape of the respective terminals 50 is not limited to the circular shape, but may be formed into a more complex shape, such as a rectangle or triangle shape.

According to the present embodiment, the opening edge 23 of the battery casing 20 and the peripheral surface 41 of the lid member 40 are adhered to one another by using the adhesive 200. However, the manner of adhesion is not limited thereto.

For example, the opening edge 23 of the battery casing 20 and the lid member 40 may be adhered to one another by depressurizing the battery casing 20.

Alternatively, the opening edge 23 of the battery casing 20 and the peripheral surface 41 of the lid member 40 may be thermally welded together. Ultrasonic waves may be used for thermal welding the opening edge 23 and the lid member 40 together.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A battery, comprising:
    a battery casing which has an opening, which stows a battery element in the inside, and which is formed of a film material;
    a lid member which is stowed in the opening and which is adhered to an opening edge of the battery casing to thereby hermetically seal the opening; and
    a pair of terminals provided to the lid member,
    wherein the lid member has:
    a base portion where the pair of terminals are provided; and
    a tab portion which is provided to the base portion and which extends along a first direction, and
    wherein a width of the tab portion along a second direction perpendicular to the first direction is narrower than a width of the base portion along the second direction.

2. The battery according to claim 1, wherein a peripheral surface of the base portion to which the opening edge adheres and a peripheral surface of the tab portion to which the opening edge adheres are smoothly continuous to one another.

3. The battery according to claim 1, wherein the lid member and the opening edge of the battery casing are rendered to be in an adhered state by depressurizing.

4. The battery according to claim 2, wherein the lid member and the opening edge of the battery casing are rendered to be in an adhered state by depressurizing.

5. A battery, comprising:
    a battery casing which has an opening, which stows a battery element in the inside, and which is formed of a film material;
    a lid member which is stowed in the opening and which is adhered to an opening edge of the battery casing to thereby hermetically seal the opening; and
    a pair of terminals provided to the lid member,
    wherein the pair of terminals provided to the lid member are each shaped like a pillar and each pass through the lid member,
    wherein the lid member has:
    a base portion where the pair of terminals are provided; and
    a tab portion which is provided to the base portion and which extends along a first direction and
    wherein a width of the tab portion along a second direction perpendicular to the first direction is narrower than a width of the base portion along the second direction.

6. The battery according to claim 5, wherein a peripheral surface of the base portion to which the opening edge adheres and a peripheral surface of the tab portion to which the opening edge adheres are smoothly continuous to one another.

7. The battery according to claim 5, wherein the lid member and the opening edge of the battery casing are rendered to be in an adhered state by depressurizing.

8. The battery according to claim 6, wherein the lid member and the opening edge of the battery casing are rendered to be in an adhered state by depressurizing.

* * * * *